United States Patent
Goerzig et al.

(10) Patent No.: US 10,437,821 B2
(45) Date of Patent: Oct. 8, 2019

(54) OPTIMIZATION OF SPLIT QUERIES

(71) Applicant: SAP SE, Walldorf (DE)

(72) Inventors: Benny Goerzig, Karlsruhe (DE);
Mathias Kohler, Karlsruhe (DE);
Florian Kerschbaum, Frankfurt (DE)

(73) Assignee: SAP SE, Walldorf (DE)

(*) Notice: Subject to any disclaimer, the term of this patent is extended or adjusted under 35 U.S.C. 154(b) by 276 days.

(21) Appl. No.: 15/335,330

(22) Filed: Oct. 26, 2016

(65) Prior Publication Data
US 2018/0113905 A1   Apr. 26, 2018

(51) Int. Cl.
*G06F 16/2453* (2019.01)
*G06F 21/60* (2013.01)
*G06F 21/62* (2013.01)

(52) U.S. Cl.
CPC ...... *G06F 16/24542* (2019.01); *G06F 21/602* (2013.01); *G06F 21/6218* (2013.01)

(58) Field of Classification Search
CPC ................................................. G06F 16/24542
See application file for complete search history.

(56) References Cited

U.S. PATENT DOCUMENTS

| | | | | |
|---|---|---|---|---|
| 7,337,163 B1* | 2/2008 | Srinivasan | ........ | G06F 17/30442 |
| 7,984,043 B1* | 7/2011 | Waas | ................ | G06F 17/30932 |
| | | | | 707/718 |
| 9,569,477 B1* | 2/2017 | McSweeney | ..... | G06F 17/30336 |
| 2009/0043750 A1* | 2/2009 | Barsness | ........... | G06F 17/30445 |
| 2011/0153593 A1* | 6/2011 | Zhou | ................. | G06F 17/30454 |
| | | | | 707/718 |
| 2015/0154258 A1* | 6/2015 | Xiong | ............... | G06F 17/30463 |
| | | | | 707/718 |
| 2017/0139991 A1* | 5/2017 | Teletia | .............. | G06F 17/30466 |
| 2018/0091306 A1* | 3/2018 | Antonopoulos | ........ | G06F 21/57 |

OTHER PUBLICATIONS

Hacgümüs, Hakan, Bala Iyer, and Sharad Mehrotra. "Efficient execution of aggregation queries over encrypted relational databases." International Conference on Database Systems for Advanced Applications. Springer Berlin Heidelberg, 2004.

(Continued)

*Primary Examiner* — Christopher J Raab
(74) *Attorney, Agent, or Firm* — Mintz Levin Cohn Ferris Glovsky and Popeo, P.C.

(57) ABSTRACT

Methods and apparatus, including computer program products, are provided for split query optimization. In some example embodiments, a method may include: determining, for a query comprising a plurality of operations, a first workload distribution between a first data store and a second data store, the first workload distribution indicating that a first portion of the query is to be performed at the first data store and a second portion of the query is to be performed at the second data store; and determining, based at least on the first workload distribution, a second workload distribution, the determining of the second workload distribution includes pushing down, to the first portion of the query, a first operation from the second portion of the query such that the first operation is performed at the first data store instead of at the second data store.

18 Claims, 13 Drawing Sheets

(56) References Cited

OTHER PUBLICATIONS

Ibaraki, Toshihide, and Tiko Kameda. "On the optimal nesting order for computing n-relational joins." ACM Transactions on Database Systems (TODS) 9.3 (1984): 482-502.

Kerschbaum, Florian, et al. "An encrypted in-memory column-store: the onion selection problem." International Conference on Information Systems Security. Springer Berlin Heidelberg, 2013.

Kerschbaum, Florian, et al. "DEMO: Adjustably encrypted in-memory column-store." Proceedings of the 2013 ACM SIGSAC conference on Computer & communications security. ACM, 2013.

Naehrig, Michael, Kristin Lauter, and Vinod Vaikuntanathan. "Can homomorphic encryption be practical?." Proceedings of the 3rd ACM workshop on Cloud computing security workshop. ACM, 2011.

Popa, Raluca Ada, et al. "CryptDB: protecting confidentiality with encrypted query processing." Proceedings of the Twenty-Third ACM Symposium on Operating Systems Principles. ACM, 2011.

Schaad, Andreas, et al. "Optimized and controlled provisioning of encrypted outsourced data." Proceedings of the 19th ACM symposium on Access control models and technologies. ACM, 2014.

Scheufele, Wolfgang, and Guido Moerkotte. "On the complexity of generating optimal plans with cross products." Proceedings of the sixteenth ACM SIGACT-SIGMOD-SIGART symposium on Principles of database systems. ACM, 1997.

Tu, Stephen, et al. "Processing analytical queries over encrypted data." Proceedings of the VLDB Endowment. vol. 6. No. 5. VLDB Endowment, 2013.

Van den Bussche, Jan, and Stijn Vansummeren. "Translating SQL into the relational algebra." Course notes, Hasselt University and Université Libre de Bruxelles (2009).

\* cited by examiner

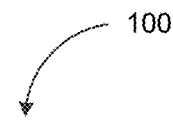

| Encr. Scheme | Abbr. | Explanation |
|---|---|---|
| Random | RND | Probabilistic encryption scheme, provides maximal security but does not allow any processing besides data retrieval |
| Deterministic | DET | Preserves the equality of values |
| Order-Preserving | OPE | Encrypted values keep the order of their respective plaintext |
| Homomorphic | HOM | Probabilistic encryption scheme, allows summation of values by replacing the addition with multiplication on ciphertext (e.g. Paillier cryptosystem) |
| Word Search | SEARCH | Allows scanning of encrypted text through search-tokens |
| Join | JOIN OPE-JOIN | Allows equality- or order-joins on encrypted data |

FIG. 1A

```
Input: Operator O
Operator[] C = O.children;
Operator P = O.parent;
if !parent then
    O.processed = true;
    return;
end
if !children || O.clientExecution || O.processed then
    O.processed = true;
    pushDown(P);
end
Operator[] partners = ruleApplicable(O, children);
if partners.empty then
    O.processed = true;
    pushDown(P);
else
    for Operator partner:partners do
        swapPosition(O, partner);
    end
    pushDown(O);
end
```

FIG. 6B

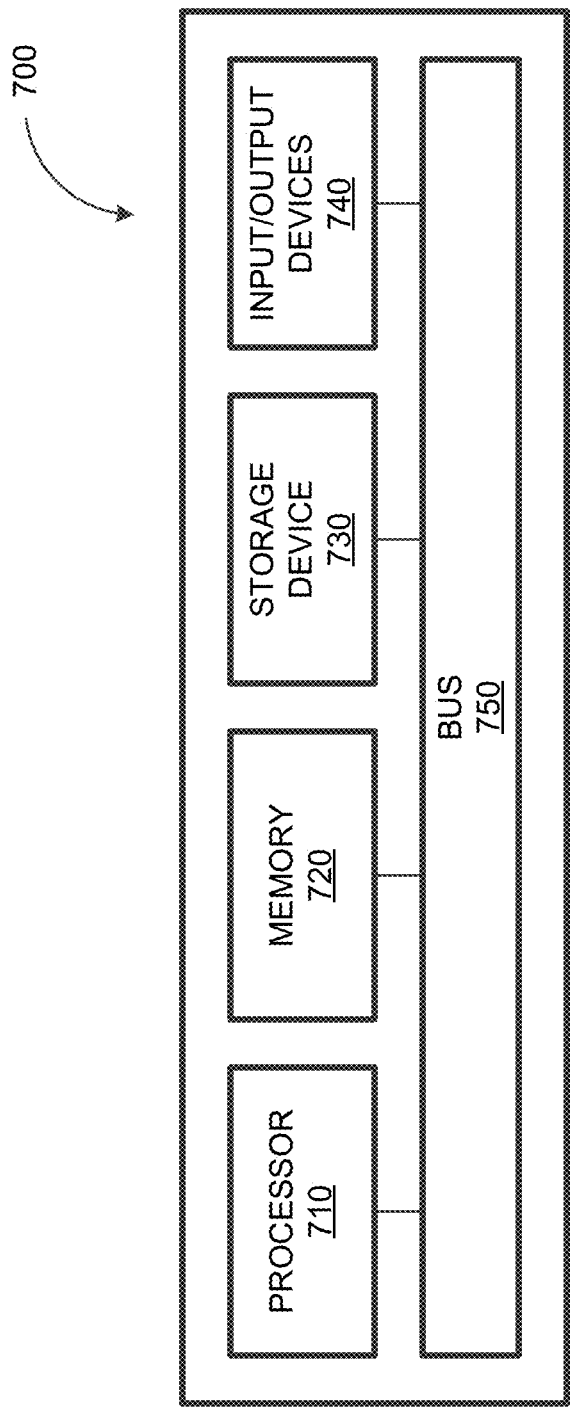

OPTIMIZATION OF SPLIT QUERIES

TECHNICAL FIELD

The subject matter described herein relates generally to database processing and more specifically to the optimization of split queries.

BACKGROUND

Remote or cloud storage (e.g., data as a service (DaaS), storage as a service (STaaS)), etc. may offer a convenient and cost effective solution for limited local storage capacity. But by offloading data to a remote database, a data owner may also be relinquishing control over the data to a third-party remote storage provider. In doing so, the data owner may be exposing sensitive data to possible misuse. For example, the data may be stored in a multi-tenant remote database and may thus comingle with data belonging to other data owners. To prevent unauthorized access to data stored at the remote database, the data may be encrypted beforehand.

SUMMARY

In one aspect, there is provided a method. The method may include: determining, for a query comprising a plurality of operations, a first workload distribution between a first data store and a second data store, the first workload distribution indicating that a first portion of the query is to be performed at the first data store and a second portion of the query is to be performed at the second data store; determining, based at least on the first workload distribution, a second workload distribution, the determining of the second workload distribution comprising pushing down, to the first portion of the query, a first operation from the second portion of the query such that the first operation is performed at the first data store instead of at the second data store; and executing the query, the executing comprising distributing, to the first data store and the second data store, respective portions of an execution plan corresponding to the first portion and the second portion of the query, the execution plan being generated based at least on the second workload distribution.

In some variations, one or more features disclosed herein including the following features can optionally be included in any feasible combination. The performing of the first operation at the first data store instead of at the second data store decreases an amount of data that is transferred from the first data store to the second data store and/or decrypted at the second data store. The first data store can be an encrypted database adapted to apply one or more encryption schemes on data stored at the first data store. The determining of the first workload distribution can include: identifying a split cause operation present in the query, the split cause operation being an operation that is incompatible with the one or more encryption schemes applied at the first data store and unable to be performed at the first data store; and including, in the second portion of the query, the split cause operation.

In some variations, the determining of the second workload distribution can include decomposing, into a plurality of atomic operations, one or more operations included in the query. The determining of the second workload distribution can further include identifying, based at least on an operator tree corresponding to the query, the first operation to push down to the first portion of the query, the first operation being an operation that is able to be performed at the first data store instead of at the second data store. The identifying of the first operation to push down to the first portion of the query can include: selecting, from the operator tree, a first node corresponding to the operation; and switching a relative position of the first node and a child node of the first node, when the first operation and a second operation corresponding to the child node are determined to be non-conflicting operations. The first operation and the second operation are determined to be non-conflicting operations, when the first operation and the second operation can be commuted, distributed, and/or combined without affecting a result of the first operation and the second operation. The identifying of the first operation to push down to the first portion of the query can further include: traversing the operator tree to select a second node corresponding to third operation; and switching a relative position of the second node and a child node of the second node, when the third operation and a fourth operation corresponding to the child node of the second node are determined to be non-conflicting operations. The operator tree can be traversed starting from a leaf node of the operator tree and the traversing of the operator tree can include skipping over one or more nodes corresponding to split cause operations.

In some variations, the identifying of the first operation to push down to the first portion of the query can include: obtaining, from the first data store, a first estimate and a second estimate of a size of an output data, the first estimate corresponding to an amount of data to be transferred from the first data store when the first operation is performed at the first data store, and the second estimate corresponding to an amount of data to be transferred from the first data store when the first operation is not performed at the first data store; and determining to push down the first operation, when the first estimate does not exceed the second estimate. The first estimate and the second estimate can be obtained from the first data store, when the first operation can output an amount of data than larger than an amount of data input into the first operation.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1A depicts a table listing a plurality of encryption schemes consistent with implementations of the current subject matter;

FIG. 6B depicts pseudo program code consistent with implementations of the current subject matter;

FIG. 7 depicts a block diagram illustrating a computing system consistent with implementations of the current subject matter.

When practical, similar reference numbers denote similar structures, features, or elements.

DETAILED DESCRIPTION

Figure 1B:
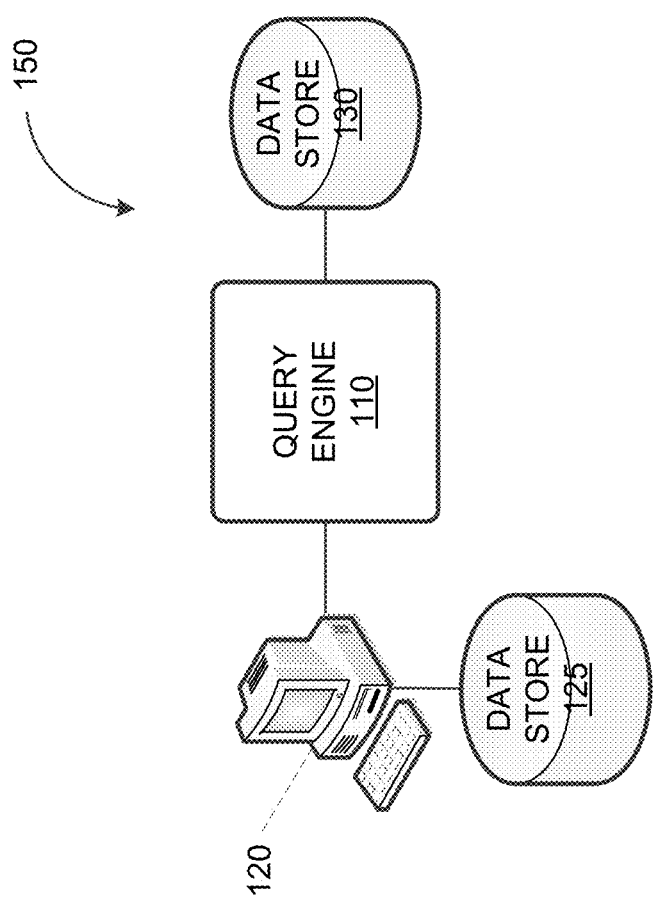
FIG. 1B depicts a block diagram illustrating a network environment consistent with implementations of the current subject matter.

Encrypting data that is stored at a remote database can prevent unauthorized access to the data. However, a database storing encrypted data often cannot support queries (e.g., structured query language (SQL)). For instance, a query for a specific range of data cannot be executed on data that has been encrypted in a manner that obliterates the order (e.g., numerical and/or alphabetical order) that is present in the data. Thus, querying encrypted data at a remote database often incurs significant resource overhead (e.g., time, bandwidth, processor). For example, a large volume of data may have to be transferred back to the data owner and decrypted before a query can be executed on the data.

In some implementations of the current subject matter, a data owner may submit a query (e.g., SQL query or the like) that includes a plurality of operations (e.g., SELECT, CARTESIAN PRODUCT, JOIN, AGGREGATE, DIFFERENCE, UNION, INTERSECT, RENAME, etc.). Meanwhile, data belonging to the data owner may be stored at a remote database and encrypted using one or more encryption schemes (e.g., random, deterministic, order-preserving, homomorphic, word search, join). FIG. 1A depicts a table 100 listing a plurality of encryption schemes consistent with implementations of the current subject matter. As shown in FIG. 1A, different encryption schemes may provide different levels of security but may also prevent the performance of certain operations. As such, the query may include operations that are not compatible with the encryption schemes used to encrypt the data at the server. These operations cannot be performed on the encrypted data at the remote database. By contrast, some of the operations included in the query may be compatible with the encryption schemes used to encrypt the data at the server and can thus be performed on the encrypted data at the remote database. Thus, according to some implementations of the current subject matter, the query may be split between the remote database and the data owner. For instance, a portion of the split query may be executed on encrypted data at the remote database while another portion of the query may be executed at a local database associated with the data owner.

In some implementations of the current subject matter, executing a portion of the query at a local database can require a transfer of encrypted data from a remote database to the local database. For example, executing a portion of a query at the local database may require data resulting from the execution of another portion of the query to be transferred from the remote database to the local database. Moreover, executing the portion of the query at the local database may further require the decryption of the encrypted data transferred from the remote database. The transfer and/or decryption of data can incur significant resource overhead (e.g., time, bandwidth, processor). Thus, according to some implementations of the current subject matter, a query can be optimized in order to minimize an amount of data that requires transferring to and/or decrypting at the local database. For instance, a query may be split such that one portion of the query is to be executed at the remote database and another portion of the query is to be executed at the local database. Optimizing the query can include maximizing the portion of the query that is executed at the remote database.

FIG. 1B depicts a block diagram illustrating a network environment 150 consistent with implementations of the current subject matter. Referring to FIG. 1, a query engine 110 may be communicatively coupled to a client device 120 and a first data store 130. As shown in FIG. 1, the first data store 130 may be a remote data store storing encrypted data. Meanwhile, the client device 120 may be communicatively coupled to a second data store 125, which may be a local data store storing unencrypted data. As used herein, the terms "local" and "remote" do not necessarily and/or merely signify a distinction in geography and/or distance between the first data store 130 and the second data store 125 relative to the client device 120. For example, a remote data store (e.g., the first data store 130) may be any data store that is accessible over a wide area network (WAN) while a local data store (e.g., the second data store 125) may be any data store that is accessible over a local area network (LAN). However, the remote data store may also be a shared (e.g., multi-tenant) data store and/or a data store that is at least partially controlled and/or operated by a third-party (e.g., a DaaS and/or STaaS provider) while a local data store (e.g., the second data store 125) may be a data store that is under the direct and/or exclusive control of a data owner (e.g., users of the client device 120).

In some implementations of the current subject matter, the functionalities of the query engine 110 may be accessed over a remote (e.g., cloud or otherwise networked) platform. As such, the query engine 110 can communicate with the client device 120 and/or the first data store 130 via a wired and/or wireless network (e.g., a wide area network (WAN), a local area network (LAN), the Internet). Alternately and/or additionally, the query engine 110 can also be deployed at the client device 120 and/or the second data store 125 as computer software and/or dedicated circuitry (e.g., application specific integrated circuits (ASICs)).

In some implementations of the current subject matter, the query engine 110 can be configured to split a query received from the client device 120. Splitting the query may include identifying one portion of the query for execution at the client device 120 and another portion of the query for execution at the first data store 130. According to some implementations of the current subject matter, the query engine 110 can split the query based at least on the one or more encryption schemes applied at the first data store 130. The query from the client device 120 may include at least one operation ((e.g., SELECT, CARTESIAN PRODUCT, JOIN, AGGREGATE, DIFFERENCE, UNION, INTERSECT, RENAME, etc.) that is incompatible with the encryption schemes applied at the first data store 130 and thus cannot performed on the encrypted data at the first data store 130. Thus, the query engine 110 can split the query by identifying one or more split cause operations, which refer to operations that cannot be performed on data that is encrypted using the one or more encryption schemes applied at the first data store 130. That is, a split cause operation can arise when the encryption schemes applied at the first data store 130 remove properties (e.g., numerical and/or alphabetical order) and/or preclude functionalities (e.g., evaluation of certain arithmetic expressions such as addition) required by the operation.

Figure 2A:
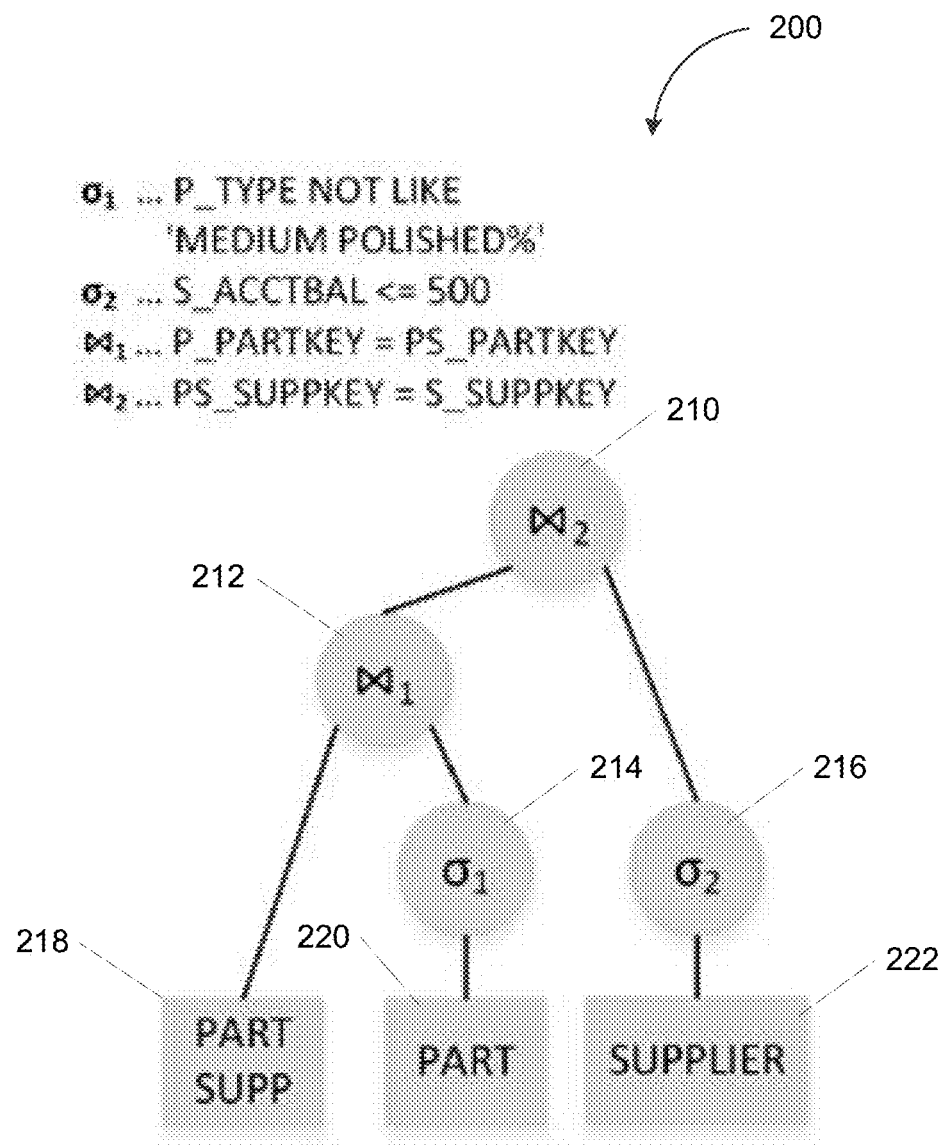
FIG. 2A depicts an operator tree of a query consistent with implementations of the current subject matter.

In some implementations of the current subject matter, the query engine 110 can generate a split query, thereby determining a workload distribution between the first data store 130 and the client device 120 and/or the second data store 125. For instance, a query can be split such that one portion of the query is executed at the first data store 130 (e.g., on encrypted data) and another portion of the query is executed at the client device 120 and/or the second data store 125 (e.g., on unencrypted data). According to some implementations of the current subject matter, the query engine 110 can generate a split query based on an operator tree corresponding to the query. FIG. 2A depicts an operator tree 200 consistent with implementations of the current subject matter. Referring to FIG. 2A, the operator tree 200 corresponds to the following query (1):

SELECT*

FROM PARTSUPP, PART, SUPPLIER

WHERE $P\_PARTKEY=PS\_PARTKEY$

AND $S\_SUPPKEY=PS\_SUPPKEY$

AND $S\_ACCTBAL<=500$

AND $P\_TYPE$ NOT LIKE 'MEDIUM POLISHED %' (1)

As shown in FIG. 2A, the operator tree 200 includes a plurality of nodes including, for example, a first node 210, a second node 212, a third node 214, a fourth node 216, a fifth node 218, a sixth node 220, and a seventh node 222. Each of the plurality of nodes in the operator tree 200 can correspond to an operation that is to be performed on data or a specific subset of data (e.g., a database table). For example, the fifth node 218 may correspond to a SELECT operation from a set of data for PART SUPP (e.g., a part supplier table) while the sixth node 220 may correspond to another SELECT operation from a set of data for PART (e.g., a parts table). Some of the operations in the query (1) may operate on data resulting from other operations in the query (1). These operations may correspond to parent nodes in the operator tree 200 including, for example, the first node 210, the second node 212, the third node 214, and the fourth node 216. For instance, the second node 212 may correspond to a JOIN operation on the data resulting from the operation at the fifth node 218 (e.g., SELECT) and the operation at the third node 214 (e.g., SELECT).

Figure 2B:
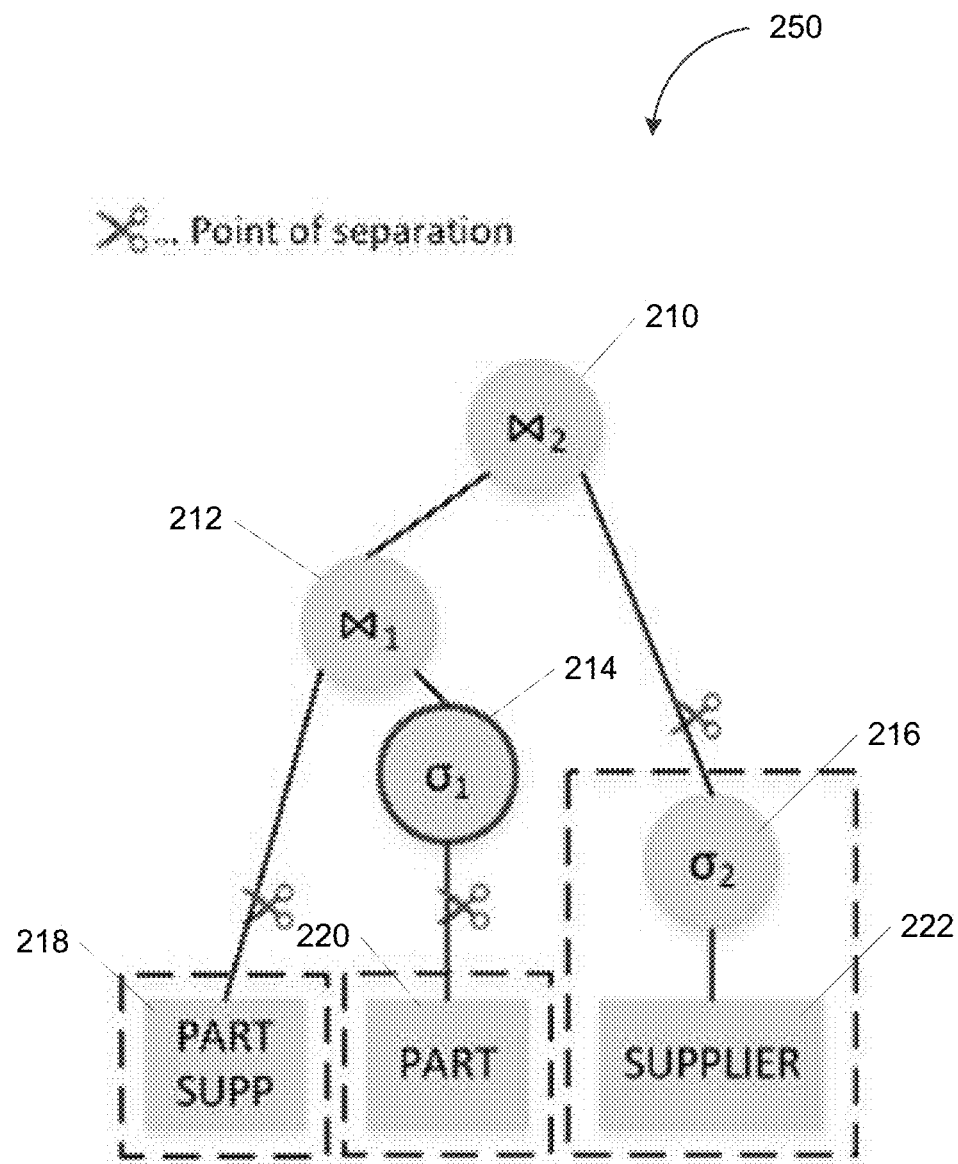
FIG. 2B depicts an operator tree of a split query consistent with implementations of the current subject matter.

FIG. 2B depicts an operator tree 250 of a split query consistent with implementations of the current subject matter. Referring to FIGS. 2A-B, the operator tree 250 may correspond to the above query (1), subsequent to the query (1) being split by the query engine 110. For instance, the query engine 110 can identify split cause operations present in the operator tree 200. That is, the query engine 110 can identify which nodes correspond to operations that cannot be performed on encrypted data (e.g., due to the encryption schemes applied at the first data store 130). As shown in FIG. 2B, the query engine 110 may determine that the first node 210, the second node 212, and the third node 214 all correspond to operations that cannot be performed on encrypted data. Thus, the query engine 110 may determine to split the query (1) such that the operations corresponding to the first node 210, the second node 212, and the third node 214 are performed at the client device 120 and/or the second data store 125 (e.g., on unencrypted data) while the operations corresponding to the fifth node 218, the sixth node 220, and the seventh node 222 are performed on encrypted data at the first data store 130.

In some implementations of the current subject matter, the query engine 110 can be further configured to optimize a query. For instance, the query engine 110 can generate a split query indicating a first workload distribution between the first data store 130 and the client device 120 and/or the second data store 125. The query engine 110 can subsequently optimize the split query, thereby generating a second workload distribution between the first data store 130 and the client device 120 and/or the second data store 125. According to some implementations of the current subject matter, the query engine 110 can optimize a query by redistributing the workload between the first data store 130 and the client device 120 and/or the second data store 125 such that the workload at the first data store 130 is maximized. Maximizing the workload at the first data store 130 may minimize the amount of data that requires transferring to and/or decryption at the client device 120 and/or the second data store 125.

Referring again to FIGS. 2A-B, the query engine 110 can optimize the query (1) by restructuring and/or reordering the operator tree 250 (e.g., of the query (1) subsequent to the identification of split causes in the query (1)) such that operations corresponding to one or more of the first node 210, the second node 212, and the fourth node 216 are performed at the first data store 130 instead of at the client device 120 and/or the second data store 125. To do so, the query engine 110 may decompose at least some of the operations in the operator tree 250 (e.g., the operations corresponding to the first node 210, the second node 212, the third node 214, the fourth node 216, the fifth node 218, the sixth node 220, and the seventh node 222) into atomic operations. For instance, an AVG operation can be decomposed into a SUM operation, a DIVIDE operation, and a COUNT operation.

Moreover, the query engine 110 can reorder at least some of the non-split cause operations in the operator tree 250 (e.g., operations corresponding to the first node 210, the second node 212, and the fourth node 216) by pushing down any non-split cause operation that is non-conflicting or dependent on data resulting from split cause operations (e.g., operations corresponding to the fourth node 216, fifth node 218, sixth node 220, and seventh node 222). Pushing down non-split cause operations can change the order in which at least some of the operations included in the query are performed. Thus, a non-split cause operation may be pushed down based on one or more transformation and/or equivalence rules indicating which operations can be commuted, distributed, and/or combined without affecting the resulting data.

For example, based on one or more transformation and/or equivalence rules, a node corresponding to a SELECT operation can be placed above the right or left child node of a node corresponding to a JOIN or a CARTESIAN PRODUCTION operation that immediately follows the SELECT operation. This reordering may be permissible when the filter criteria of the SELECT operation use expressions that are available in the right or the left child node. Alternately and/or additionally, a node corresponding to a SELECT operation can be placed above the left child node of a node corresponding to a DIFFERENCE operation that immediately follows the SELECT operation. This reordering may be permissible if the filter criteria of the SELECT operation use operations that are available to the left child node.

By pushing down a non-split cause operation, that non-split cause operation may be performed at the first data store 130 instead of at the client device 120 and/or the data store 125. According to some implementations of the current subject matter, the query engine 110 can determine push down (e.g., for performance at the first data store 130) operations that can only reduce the size of the input data (e.g., SELECT, AGGREGATE). By contrast, the query engine 110 may rely on one or more output size estimates when determining whether to push down operations that can potentially increase the size of the input data (e.g., JOIN).

Figure 2C:
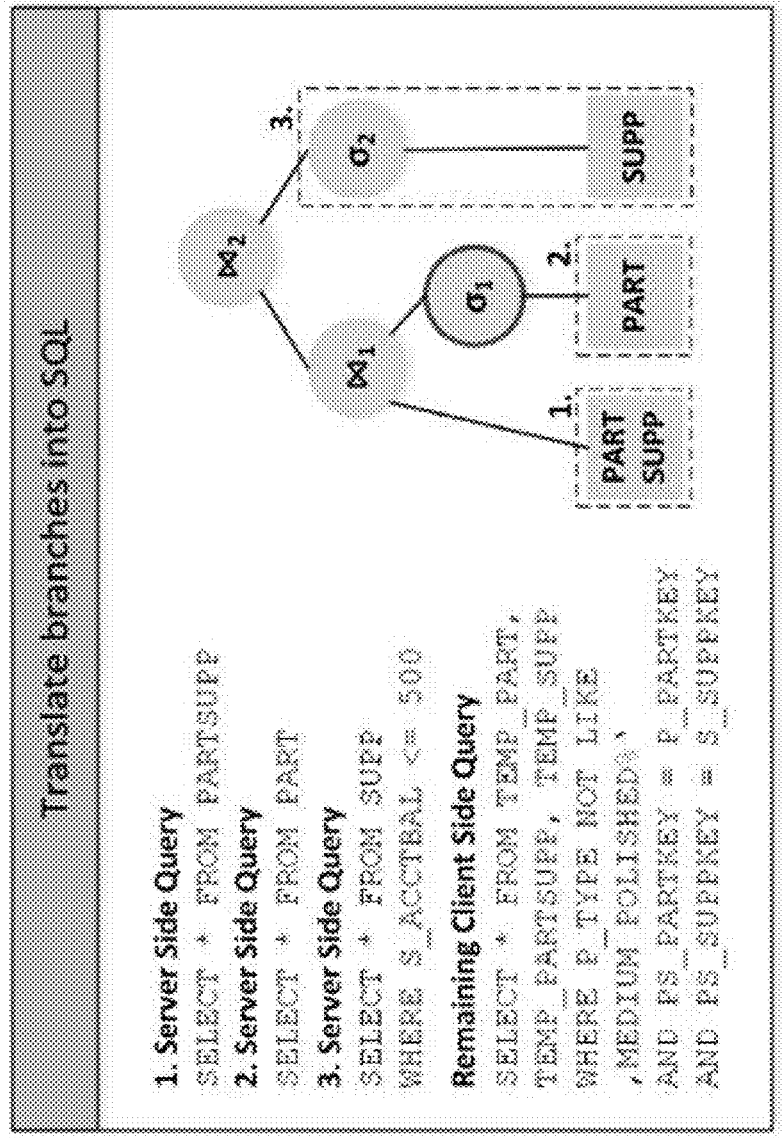
FIG. 2C depicts an execution plan for an optimized split query consistent with implementations of the current subject matter.
Figure 3:
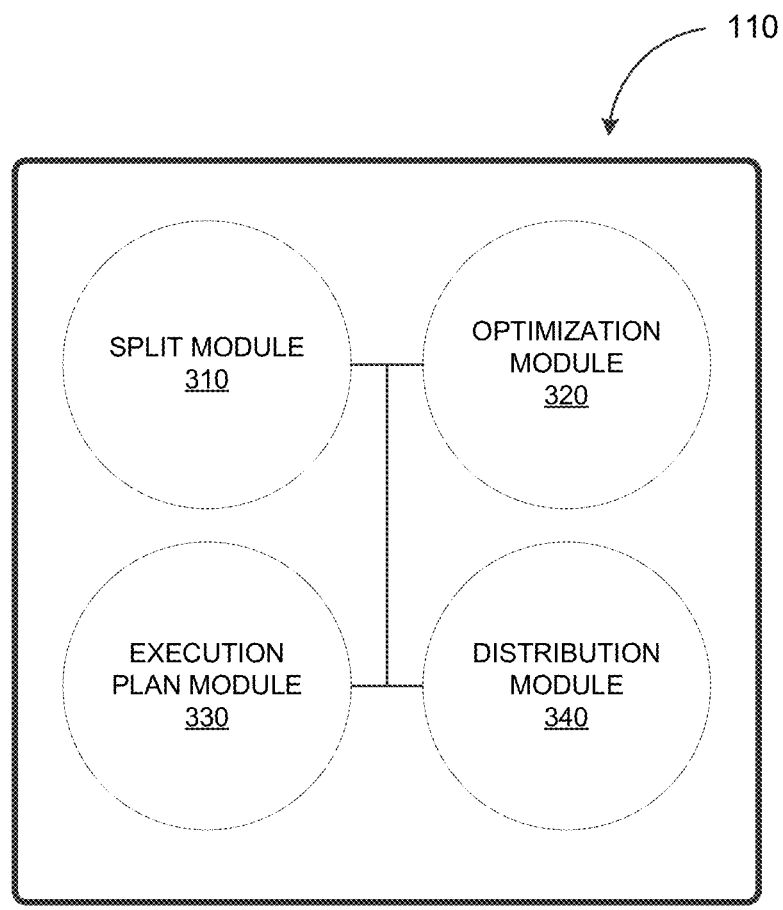
FIG. 3 depicts a block diagram illustrating a query engine consistent with implementations of the current subject matter.

FIG. 3 depicts a block diagram illustrating the query engine 110, in accordance with some example embodiments. Referring to FIGS. 1-3, the query engine 110 may include a split module 310, an optimization module 320, an execution plan module 330, and a distribution module 340.

In some implementations of the current subject matter, the split module 310 can be configured to generate, for a query (e.g., received from the client device 120), a corresponding split query that indicates a first workload distribution between the first data store 130 and the client device 120 and/or the second data store 125. The split module 310 can generate the split query by identifying one or more split cause operations that are present in the query. According to some implementations of the current subject matter, a split cause operation is an operation that cannot be performed at the first data store 130 because the operation is incompatible with the one or more encryption schemes applied at the first data store 130. For instance, the first data store 130 may apply one or more encryption schemes that remove, from data stored at the first data store 130, at least one property (e.g., numerical and/or alphabetical order) required for the performance of the operation. Such operations are to be performed on at the client device 120 and/or the second data store 135 (e.g., on decrypted data) and not at the first data store 130 (e.g., on encrypted data).

Performing one or more operations at the client device 120 and/or the second data store 135 can require encrypted data from the first data store 135 to be transferred to and/or decrypted at the client device 120 and/or the second data store 135. This transfer and/or decryption of data can increase the resource overhead associated with executing the query. As such, in some implementations of the current subject matter, the optimization module 320 can be configured to optimize a query by redistributing the workload indicated by the split query (e.g., generated by the split module 310). For instance, the optimization module 320 can redistribute the workload such that the workload at the first data store 130 is maximized. Maximizing the workload at the first data store 130 can reduce the resource overhead (e.g., time, bandwidth, processor) associated with the execution of the query by minimizing an amount of data that is transferred to and/or decrypted at the client device 120 and/or the second data store 125.

According to some implementations of the current subject matter, the optimization module 320 can optimize the query by decomposing at least some of the operations included in the query into atomic operations. For example, an AVG operation in the query can be decomposed into a SUM operation, a DIVIDE operation, and a COUNT operation. Alternately and/or additionally, the optimization module 320 can optimize the query by reordering at least some of the non-split cause operations in the query. For instance, by applying one or more equivalence rules, the optimization module 320 can push down at least some non-conflicting operations that are not dependent on data resulting from split cause operations, thereby causing these operations to be performed at the first data store 130 (e.g., on encrypted data) instead of at the client device 120 and/or the second data store 125. In some implementations of the current subject matter, the optimization module 320 can be configured to push down operations that can only reduce the size of the input data including, for example, SELECT and AGGREGATE. By contrast, some operations (e.g., JOIN) can potentially increase the size of the input data, thereby increasing the amount of data that requires transferring to and/or decryption at the client device 120 and/or the second data store 125. As such, the optimization module 320 can determine, based on one or more output size estimates, whether some operations (e.g., JOIN) should be pushed down.

In some implementations of the current subject matter, the execution plan module 330 can be configured to generate an execution plan corresponding to an optimized split query (e.g., generated by the optimization module 320). For example, the execution plan module 330 can generate an execution plan by translating one or more portions of the optimized split query into SQL statements. FIG. 2C depicts an execution plan 260 consistent with implementations of the current subject matter. Referring to FIGS. 2A-C, the execution plan module 330 may generate the execution plan 260 for the above query (1). The execution plan 260 can include a plurality of SQL statements corresponding to operations that are to be performed at the first data store 130 (e.g., server side) and operations that are to be performed at the client device 120 and/or the second data store 125 (e.g., client side). As shown in FIG. 2C, the execution plan 260 can be generated for the query (1), subsequent to the identification of split cause queries present in the query (1). However, it should be appreciated that the execution plan module 330 can generate an execution plan for the query (1) subsequent to the optimization of the query (1) such that a number of operations set forth by the execution plan for performance at the first data store 130 is maximized.

In some implementations of the current subject matter, the distribution module 340 can be configured to distribute portions of the execution plan (e.g., generated by the execution plan module 330). For instance, the distribution module 340 can distribute, to the first data store 130, portions of the execution plan that include operations to be performed at the first data store 130 (e.g., SQL statements for operations corresponding to the fourth node 216, the fifth node 218, the sixth node 220, and the seventh node 222). Alternately and/or additionally, the distribution module 340 can distribute, to the client device 120 and/or the second data store 125, portions of the execution plan that include operations to be performed at the client device 120 and/or the second data store 125 (e.g., SQL statements for operations corresponding to the first node 210, the second node 212, and the third node 214).

Figure 4:
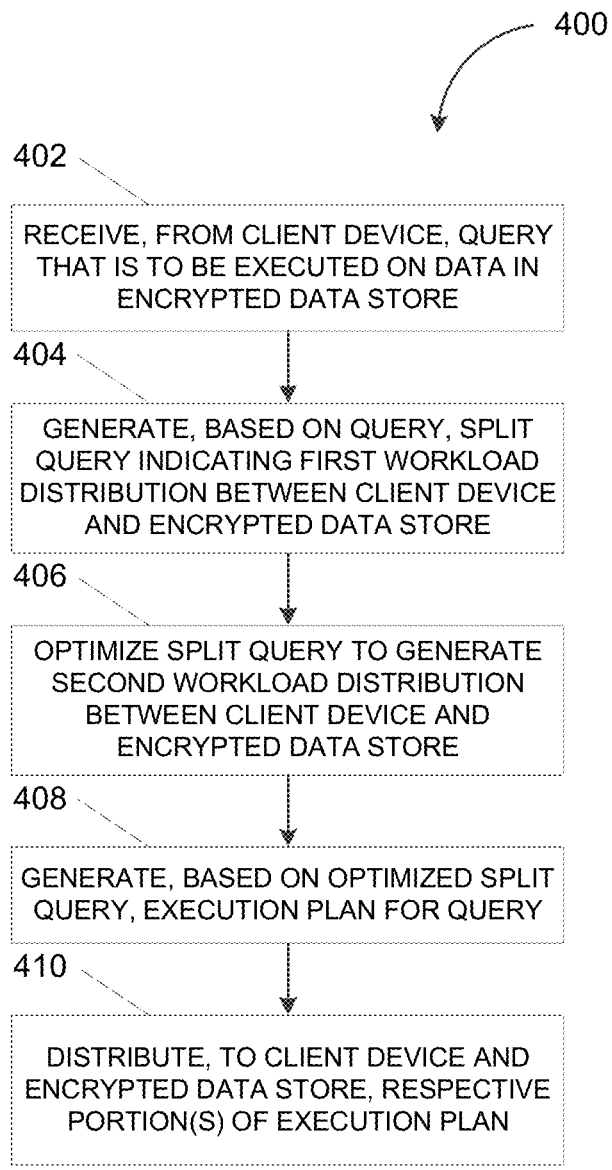
FIG. 4 depicts a flowchart illustrating a process for processing a query consistent with implementations of the current subject matter.

FIG. 4 depicts a flowchart illustrating a process 400 for processing a query consistent with implementations of the current subject matter. Referring to FIGS. 1-4, the process 400 may be performed by the query engine 110.

The query engine 110 can receive, from a client device, a query that is to be executed on data in an encrypted data store (402). For example, the query engine 110 can receive, from the client device 120, a query that is to be executed on data stored at the first data store 130.

The query engine 110 can generate, based at least on the query, a split query indicating a first workload distribution between the client device and the encrypted data store (404). For example, the query engine 110 (e.g., the split module 310) can generate a split query by identifying one or more split cause operations that are present in the query. A split cause operation refers to an operation in the query that is incompatible with the one or more encryption schemes applied at the first data store 130. Thus, the query engine 110 can identify split cause operations such that split cause operations and/or operations that rely on data resulting from split cause operations are performed on unencrypted data at the client device 120 and/or the second data store 125. By contrast, non-split cause operations and/or operations that do not rely on data resulting from split cause operations are performed on encrypted data at the first data store 130.

The query engine 110 can optimize the split query to generate a second workload distribution between the client device and the encrypted data store (406). For example, the query engine 110 (e.g., the optimization module 320) can optimize a split query to generate a second workload distribution that maximizes the workload at the first data store 130, thereby reducing the amount of data that requires transferring to and/or decryption at the client device 120 and/or the second data store 125. The query engine 110 can optimize the split query by decomposing at least some of the operations in the query into atomic operations. Alternately and/or additionally, the query engine 110 can optimize the split query by applying equivalence rules to push down at least some non-conflicting, non-split cause operations such that more operations can be performed at the first data store 130 instead of at the client device 120 and/or the second data store 125.

The query engine 110 can generate, based at least on the optimized split query, an execution plan for the query (408). For example, the query engine 110 (e.g., the execution plan module 330) can generate an execution plan (e.g., the execution plan 260) for an optimized split query by translating the optimized split query into one or more SQL statements. As such, the execution plan may include SQL statements for operations to be performed at the first data store 130 and/or SQL statements for operations to be performed at the client device 120 and/or the second data store 125.

The query engine 110 can distribute, to the client device and/or the encrypted data store, respective portions of execution plan (410). For instance, the query engine 110 (e.g., the distribution module 340) can distribute, to the first data store 130, portions of the execution plan that includes operations (e.g., SQL statements) to be performed at the first data store 130. Alternately and/or additionally, the query engine 110 (e.g., the distribution module 340) can distribute, to the client device 120 and/or the second data store 125, portions of the execution plan that includes operations (e.g., SQL statements) to be performed at the client device 120 and/or the second data store 125.

Figure 5A:
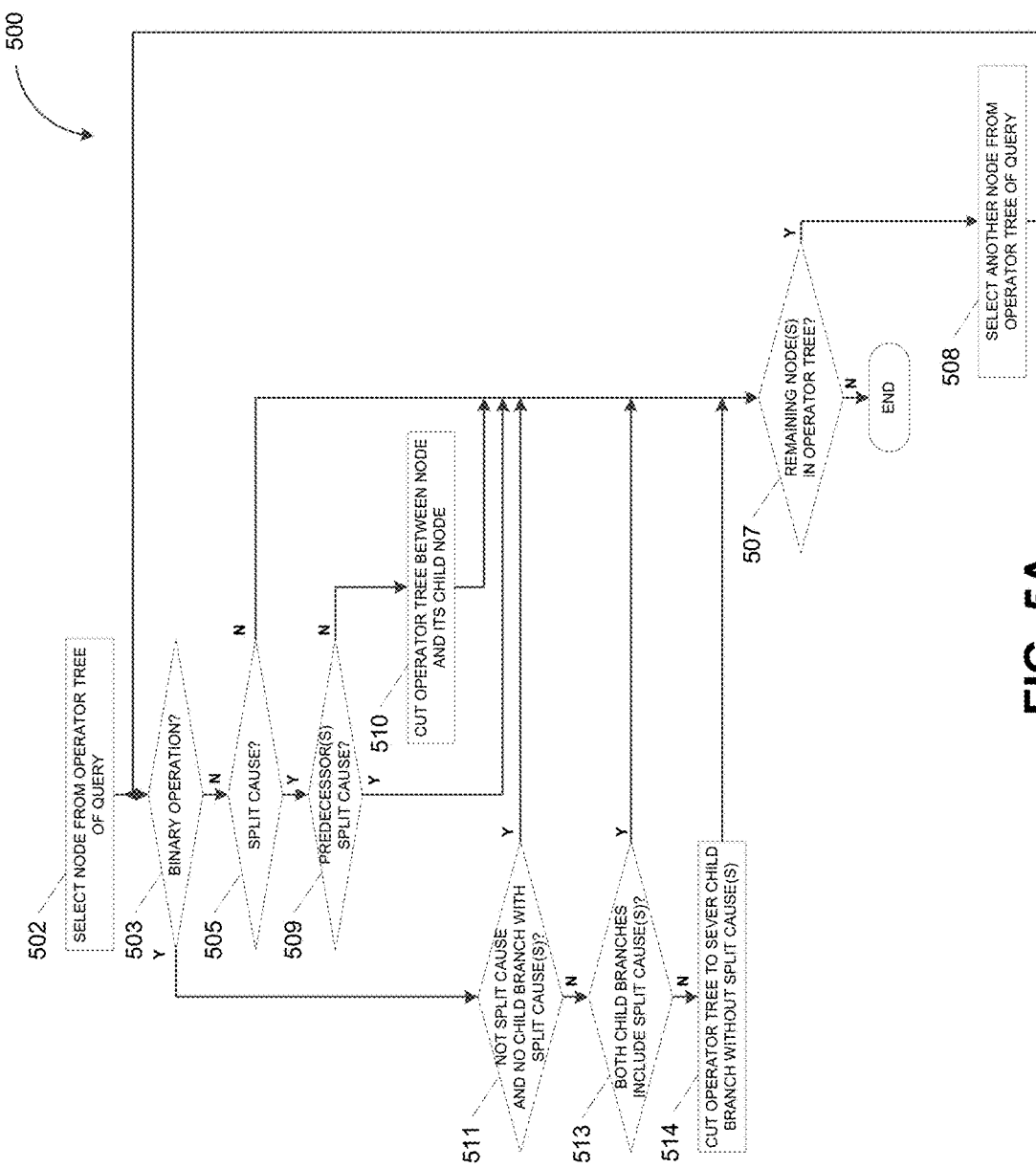
FIG. 5A depicts a flowchart illustrating a process for generating a split query consistent with implementations of the current subject matter.

FIG. 5A depicts a flowchart illustrating a process 500 for generating a split query consistent with implementations of the current subject matter. Referring to FIGS. 1-5, the process 500 can be performed by the query engine 110 (e.g., the split module 310) and can implement operation 404 of the process 400.

The query engine 110 can select a node from an operator tree corresponding to a query (502). For instance, the query engine 110 (e.g., the split module 310) can generate a split query by traversing the operator tree of a corresponding query from the bottom up (e.g., starting from the leaf nodes). Referring to FIG. 2A, the query engine 110 can generate a split query for the query (1) by traversing the corresponding operator tree 200 from one of the leaf nodes (e.g., the fifth node 218, the sixth node 220, and the seventh node 222), which may be selected arbitrarily. That is, the operator tree 200 can be traversed from the bottom up such that child nodes are processed before their parent nodes. Moreover, in some implementations of the current subject matter, the operator tree 200 is traversed once to generate a split query. However, the operator tree 200 can also be traversed multiple times without departing from the scope of the present disclosure.

The query engine 110 can determine whether the node corresponds to a binary operation (503). A binary operation can refer to an operation that operates on data from two child nodes. For example, the operations corresponding to the first node 210 and the second node 212 are binary operations. By contrast, a unary operation can refer to an operation that operates on data from only a single child node. The operations corresponding to the third node 214, the fourth node 216, the fifth node 218, the sixth node 220, and the seventh node 222 are all examples of unary operations.

If the query engine 110 determines that the node does not correspond to a binary operation (503—N), the query engine 110 can determine whether the operation at the node is a split cause operation (505). For example, when the query engine 110 (e.g., the split module 310) determines that the node corresponds to a unary operation, the query engine 110 can determine whether that unary operation is itself a split cause operation that cannot be performed at the first data store 130 because the operation is incompatible with the encryption schemes applied at the first data store 130.

If the query engine 110 determines that the operation at the node is not a split cause operation (505—N), the query engine 110 can determine whether there are any remaining nodes in the operator tree corresponding to the query (507). That is, if the query engine 110 determines that the operation at the node is not a split cause operation, the query engine 110 (e.g., the split module 310) can continue to traverse the operator tree 200. Thus, if the query engine 110 determines that there are no remaining nodes in the operator tree (507—N), the process 500 can terminate. Alternately and/or additionally, if the query engine 110 determines that there are remaining nodes in the operator tree corresponding to the query (507—Y), the query engine 110 can select another node from the operator tree corresponding to the query (508) and the process 500 can continue at operation 503.

By contrast, if the query engine 110 determines that the operation at the node is a split cause operation (505—Y), the query engine 110 can further determine whether any predecessor nodes of the node also correspond to split cause operations (509). For example, if the query engine 110 (e.g., the split module 310) determines that the operation corresponding to the third node 214 is a split cause operation (e.g., that cannot performed at the first data store 130), the query engine 110 can further determine whether the sixth node 220 also corresponds to a split cause operation.

In some implementations of the current subject matter, each node in the operator tree 200 can be associated with a flag (e.g., a LocalExecution flag) indicative of whether the operation corresponding to the node itself and/or any of its predecessor nodes correspond to a split cause operation that require execution at the second data store 125. The predecessor nodes of the node may include its immediate child nodes as well as the child nodes the child nodes and so forth. The flag may obviate the traversal of all predecessor nodes in operation 509. For instance, the query engine 110 can determine whether any of a node's predecessor nodes correspond to split cause operations by examining the flag associated with that node's child node. If the flag is set to TRUE, then at least one of the node's predecessor nodes correspond to a split cause operation. By contrast, if the flag is set to FALSE, then none of the node's predecessor nodes correspond to a split cause operation.

The query engine 110 can determine that at least one predecessor node of the node also corresponds to a split cause operation (509—Y). In this scenario, the operator tree 200 has already been cut below the node. As such, the operator tree 200 does not require another cut at the cut. Accordingly The process 500 can continue at operation 507 such that the query engine 110 can continue to traverse the operator tree 200.

By contrast, if the query engine 110 determines that none of the predecessors of the node correspond to a split cause operation (509—N), the query engine 110 can cut the operator tree 110 between the node and its child node (510). For instance, the query engine 110 (e.g., the split module 310) can determine that the sixth node 220 is not a split cause operation. As such, the query engine 110 can cut the operator tree 200 between the third node 214 and the sixth node 220. The cut between the third node 214 and the sixth node 220 indicates that the operation corresponding to the third node 214 is to be performed at the client device 120 and/or the second data store 125 while the operation corresponding to the sixth node 220 is to be performed at the first data store 130. The process 500 can continue at operation 507 such that the query engine 110 can continue to traverse the operator tree 200.

Alternately and/or additionally, the query engine 110 can determine that the node corresponds to a binary operation (503—Y). For instance, the query engine 110 can determine that the second node 212 correspond to a binary operation that operates on data from the third node 214 and the fifth node 218. As such, the query engine 110 can determine whether the node does not correspond to a split cause operation and none of the node's child branches include a split cause operation (511). For example, the query engine 110 can determine whether the second node 212 does not correspond to a split cause operation. Furthermore, the query engine 110 can determine whether neither the right child branch nor the left child branch of the second node 212 include a split cause operation.

If the query engine 110 determines that the node does not correspond to a split cause operation and that none of its child branches include a split cause operation (511—Y), the process 500 can continue at operation 507. For example, the query engine 110 the second node 212 does not correspond to a split cause operation and that none of its child branches (e.g., the left child branch containing the fifth node 218 and the right branch containing the third node 214 and the sixth node 220) include a split cause operation. In this scenario, the query engine 110 can continue to traverse the operation tree 200 without making any cuts to the operation tree 200.

By contrast, the query engine 110 can determine that node corresponds to a split cause operation and/or that at least one of the node's child branches include one or more split cause operations (511—N). For example, the query engine 110 can determine that the second node 212 correspond to a split cause operation. Alternately and/or additionally, the query engine 110 can determine that one or both of the left child branch and right child branch of the second node 212 includes at least one split cause operation. In this scenario, the query engine 110 can determine whether both of the node's child branches include one or more split cause operations (513).

If the query engine 110 determines that both of the node's child branches include one or more split cause operations (513—Y), the process 500 can resume at operation 507. For instance, the query engine 110 can continue to traverse the operator tree 200 without cutting the operator tree 200, when both the right child branch and the right child branch of the second node 212 include one or more split cause operations. This is because operator tree 200 would have already been cut along the right child branch and the left child branch, thereby obviating the need to further cut the operator tree 200 along those branches. Based on those cuts, operations along the right child branch and the left child branch that precede the split cause operations may be performed at the first data store 130. Meanwhile, operations along the right child branch and the left child branch that follow the split cause operations rely on the results from the split cause operations and are therefore performed at the client 120 and/or the second data store 125 along with the split cause operations. Notably, the operation corresponding to the second node 212 follow the split cause operations included in both the left child branch and right child branch. Thus, the operation corresponding to the second node 212 is performed at the client 120 and/or the second data store 125, regardless of whether the operation corresponding to the second node 212 is a split cause operation or not.

Alternately and/or additionally, if the query engine 110 determines that the child branches of the node do not both include one or more split causes (513—N), the query engine 110 can cut the operator tree to sever the child branch that does not include any split cause operations (514). For instance, the query engine 110 can determine that the left child branch of the second node 212 does not include any split cause operations while the right child branch of the second node 212 includes at least one split cause operation (e.g., the operation corresponding to the third node 214). In this scenario, the query engine 110 can cut the operator tree 200 such that the left child branch is truncated while the right child branch remains intact with the second node 212. The query engine 110 can then continue to traverse the operator tree 200 as the process 500 continues at operation 507.

In some implementations of the current subject matter, the query engine 110 can sever the left child branch such that the operations along that left child branch (e.g., the operation corresponding to the fifth node 218) can be performed at the first data store 130. By contrast, the query engine 110 does not sever the right child branch because the right child branch includes at least one split cause operation (e.g., the operation corresponding to the third node 214). Accordingly, the operator tree 200 has already been cut along the right child branch and is therefore not cut again, even when the second node 212 is determined to correspond to a split cause operation. Instead, the second node 212 remains intact with its right child branch such that the operation corresponding to the second node 212 and any operation that follows the split cause operation along the right child branch are performed at the client device 120 and/or the second data store 125. Notably, the operation corresponding to the second node 212 is performed at the client device 120 and/or the second data store 125 even if the second node 212 does not correspond to a split cause operation. This is because the operation corresponding to the second node 212 relies on the results from the split cause operations along its right child branch.

The process 500 can continue at operation 507. For instance, the query engine 110 can continue to traverse the operator tree 200.

Figure 5B:
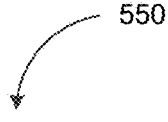
FIG. 5B depicts pseudo program code consistent with implementations of the current subject matter.

FIG. 5B depicts pseudo program code 550 consistent with implementations of the current subject matter. Referring to FIGS. 5A-B, in some implementations of the current subject matter, the pseudo program code 550 can implement the process 500.

Figure 6A:
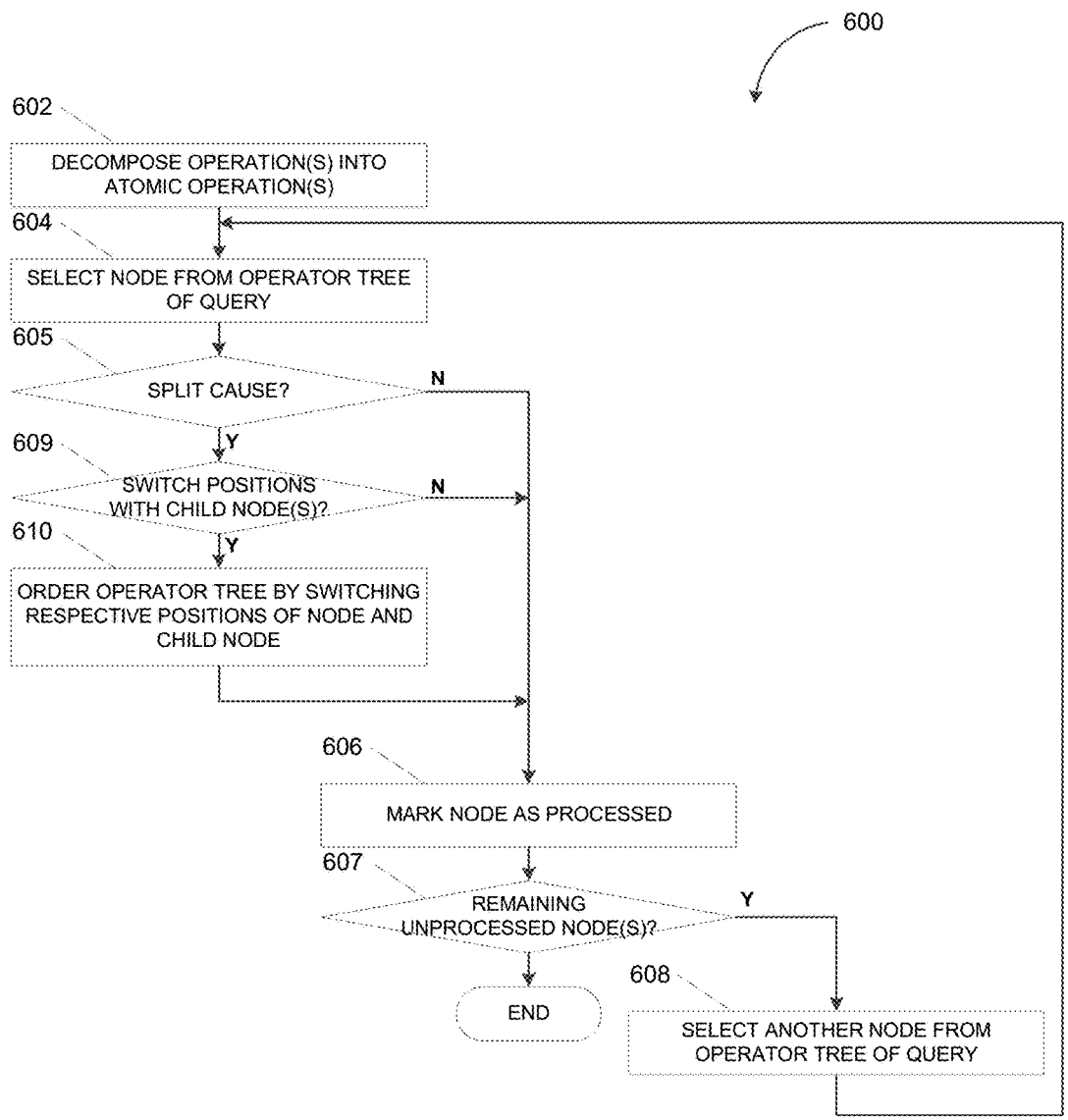
FIG. 6A depicts a flowchart illustrating a process for optimizing a split query consistent with implementations of the current subject matter.

FIG. 6A depicts a flowchart illustrating a process 600 for optimizing a split query consistent with implementations of the current subject matter. Referring to FIGS. 1-6A, the process 600 can be performed by the query engine 110 (e.g., the optimization module 320) and can implement operation 406 of the process 400.

The query engine 110 can decompose at least one operation in a query into two or more atomic operations (602). For example, the query engine 110 can decompose an AVG operation into a SUM operation, a DIVIDE operation, and a COUNT operation. Similarly, an AGGREGATE operation that includes an AVG operation can also be decomposed into a SUM operation, a DIVIDE operation, and a COUNT operation. A conjunctive SELECT operation can also be decomposed into a series of atomic SELECT operations.

The query engine 110 can select a node from the operator tree corresponding to a query (604). For example, the query engine 110 can traverse the operator tree of a split query from the bottom up (e.g., starting from the leaf nodes). Referring to FIG. 2B, the query engine 110 can optimize the split query (1) by traversing the corresponding operator tree 250 from one of the leaf nodes (e.g., the fifth node 218, the sixth node 220, and the seventh node 222).

The query engine 110 can determine whether the node corresponds to a split cause operation (605). For example, the query engine 110 can determine whether the third node 214 corresponds to a split cause operation that cannot be performed on encrypted data at the first data store 130. If the query engine 110 determines that the node corresponds to a split cause operation (605—Y), the query engine 110 can mark the node as processed (606). The query engine 110 can further determine whether there are any remaining unprocessed nodes in the operator tree (607). That is, when traversing the operator tree 250, the query engine 110 (e.g., optimization module 110) can skip over split cause operations as split cause operations are indirectly repositioned through the reordering of other non-split cause operations. If the query engine 110 determines that there are no remaining unprocessed nodes in the operator tree (607—N), the process 600 can terminate. Alternately and/or additionally, if the query engine 110 determines that there are remaining unprocessed nodes in the operator tree (607—Y), the query engine 110 can select another node from the operator tree (608) and the process 600 can continue at operation 605.

If the query engine 110 determines that the node does not correspond to a split cause operation (605—N), the query engine 110 can determine whether the node can switch positions with any of its child nodes (609). For example, the query engine 110 can apply one or more transformation and/or equivalence rules to determine whether the first node 212 can switch positions with the fourth node 214. Two nodes can switch positions if the operations corresponding to the nodes are non-conflicting. Thus, the second node 212 can switch positions with the fourth node 214 if the corresponding operations can be commuted (e.g., performed in any order), distributed, and/or combined. By recursively switching the positions of parent and child nodes in the operator tree 250, the query engine 110 (e.g., the optimizer module 110) can push down operations (e.g., past split cause operations) such that additional operations can be performed at the first data store 130 instead of at the client device 120 and/or the second data store 125.

In some implementations of the current subject matter, the transformation and/or equivalence rules can indicate when two or more operations can be commuted, distributed, combined, and/or the like. A succession of commutative operations such SELECT, JOIN, UNION, INTERSECT, and/or the like can be performed in any order. Meanwhile, some operations can be distributive over other operations. For instance, a PROJECT operation can be distributed over a JOIN or UNION operation. A SELECT operation can be distributed over a UNION, INTERSECT, or DIFFERENCE operation. Some operations can be combined with other operations. For example, a SELECT operation can be combined with a CARTESIAN PRODUCT operation that immediately follows the SELECT operation, thereby forming a JOIN operation with the same filter criteria of the initial SELECT operation. A SELECT operation can also be combined with a JOIN operation that immediately follows the SELECT operation, thereby forming a new JOIN operation with the additional filter criteria of the SELECT operator.

Based on one or more transformation and/or equivalence rules, a node corresponding to a SELECT operation can be placed above the right or left child node of a node corresponding to a JOIN or a CARTESIAN PRODUCTION operation that immediately follows the SELECT operation. This reordering may be permissible when the filter criteria of the SELECT operation use expressions that are available in the right or the left child node. Alternately and/or additionally, a node corresponding to a SELECT operation can be placed above the left child node of a node corresponding to a DIFFERENCE operation that immediately follows the SELECT operation. This reordering may be permissible if the filter criteria of the SELECT operation use operations that are available to the left child node.

According to some example embodiments, in addition to and/or instead of equivalence rules, the query engine 110 may rely on output size estimates in order to determine whether the positions of two nodes in the operator tree 250 should be switched. In particular, the query engine 110 may rely on output size estimates when the operation corresponding to a parent node (e.g., the second node 212) is an operation that can potentially increase the size of the input data (e.g., JOIN). Pushing down such an operation for performance at the first data store 130 can increase the amount of data that requires transferring to and/or decryption at the client device 120 and/or the second data store 125. Thus, query engine 110 can obtain, from the first data store 130, an estimate of the amount of data that requires transferring from the first data store 130 when this operation is performed at the first data store 130 and when this operation is not performed at the first data store 130. The query engine 110 can determine to push down the operation, when the output data estimate indicates that performing the operation at the first data store 130 decreases the amount of data that is transferred from the first data store 130.

In some implementations of the current subject matter, if the query engine 110 determines that the node can switch positions with a child node (609—Y), the query engine 110 can reorder the operator tree by switching the respective positions of the node and its child node (610). The process 600 can subsequently continue at operation 606. That is, the query engine 110 can mark the node as processed (606) and continue to traverse the operator tree 250.

Alternately and/or additionally, if the query engine 110 determines that the node cannot switch positions with a child node (609—N), the process 600 can continue at operation 606. The query engine 110 can mark the node as processed (606) and continue to traverse the operator tree 250.

FIG. 6B depicts pseudo program code 650 consistent with implementations of the current subject matter. Referring to FIGS. 6A-B, in some implementations of the current subject matter, the pseudo program code 650 can implement the process 600.

Figure 6C:
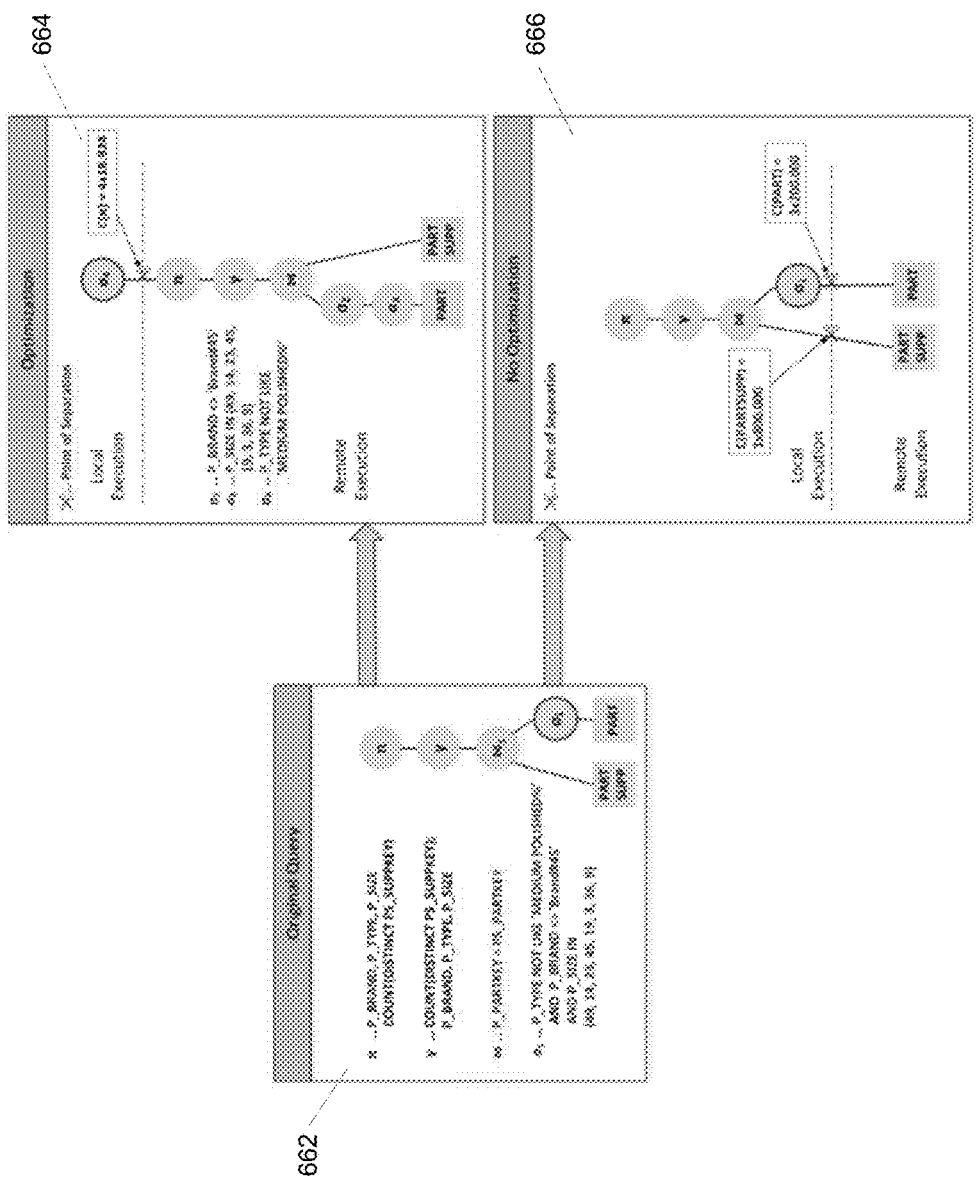
FIG. 6C depicts an optimization of a split query consistent with implementations of the current subject matter.

FIG. 6C depicts an optimization of a split query consistent with implementations of the current subject matter. Referring to FIG. 6C, a query corresponding to a first operator tree 662 can be split without any optimization, as shown by a second operator tree 664. The workload distribution indicated by the second operator tree 664 indicates that only two operations from the query are being performed remotely (e.g., at the first data store 130) while the majority of operations from the query are being performed locally (e.g., at the client device 120 and/or the second data store 125). By contrast, a third operator tree 666 corresponds to a split query that has been optimized. As shown by the third operator tree 666, optimizing the query enables additional operations to be performed at the remotely (e.g., the first data store 130). Meanwhile, only a single operation is being performed locally (e.g., at the client device 120 and/or the second data store 125), thereby minimizing the amount of data that requires transferring and/or decryption.

FIG. 7 depicts a block diagram illustrating a computing system 700, in accordance with some example embodiments. Referring to FIGS. 1-7, the computing system 700 can be used to implement the query engine 1110.

As shown in FIG. 7, the computing system 700 can include a processor 710, a memory 720, a storage device 730, and input/output devices 740. The processor 710, the memory 720, the storage device 730, and the input/output devices 740 can be interconnected via a system bus 750. The processor 710 is capable of processing instructions for execution within the computing system 700. Such executed instructions can implement one or more components of, for example, the query engine 110. In some example embodiments, the processor 710 can be a single-threaded processor. Alternately, the processor 710 can be a multi-threaded processor. The processor 710 is capable of processing instructions stored in the memory 720 and/or on the storage device 730 to display graphical information for a user interface provided via the input/output device 740.

The memory 720 is a computer readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some example embodiments, the input/output device 740 includes a keyboard and/or pointing device. In various implementations, the input/output device 740 includes a display unit for displaying graphical user interfaces.

According to some implementations of the current subject matter, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet).

In some example embodiments, the computing system 700 can be used to execute various interactive computer software applications that can be used for organization, analysis and/or storage of data in various (e.g., tabular) format (e.g., Microsoft Excel®, and/or any other type of software). Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 740. The user interface can be generated and presented to a user by the computing system 700 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
determining, for a query comprising a plurality of operations, a first workload distribution between a first data store storing encrypted data and a second data store storing unencrypted data, the query including a first portion that can be performed on the encrypted data and a second portion that cannot be performed on the encrypted data, the first workload distribution being determined based at least on the second portion of the query being unable to be performed on the encrypted data in the first data store, and the first workload distribution indicating that the first portion of the query is to be performed at the first data store and the second portion of the query is to be performed at the second data store;
determining, based at least on the first workload distribution, a second workload distribution, the determining of the second workload distribution comprising a reordering of at least a first operation and a second operation in the second portion of the query, the first operation and the second operation being reordered based at least on the first operation and the second operation being non-conflicting operations that can be at least one of commuted, distributed, and combined without affecting a respective result of the first operation and the second operation, and the reordering including pushing down, to the first portion of the query, the first operation such that the first operation is performed at the first data store instead of at the second data store; and
executing the query, the executing comprising distributing, to the first data store and the second data store, respective portions of an execution plan corresponding to the first portion of the query and the second portion of the query, the execution plan being generated based at least on the second workload distribution.

2. The computer-implemented method of claim 1, wherein the encrypted data in the first data store is generated at least by applying one or more encryption schemes.

3. The computer-implemented method of claim 2, wherein the determining of the first workload distribution comprises:
identifying a split cause operation present in the query, the split cause operation being an operation that is incompatible with the one or more encryption schemes applied at the first data store and unable to be performed on the encrypted data in the first data store; and
including, in the second portion of the query, the split cause operation.

4. The computer-implemented method of claim 1, wherein the determining of the second workload distribution comprises:
decomposing, into a plurality of atomic operations, one or more operations included in the query.

5. The computer-implemented method of claim 1, wherein the determining of the second workload distribution further comprises:
identifying, based at least on an operator tree corresponding to the query, the first operation to push down to the first portion of the query, the first operation being identified based at least on the first operation being an operation that can be performed on the encrypted data in the first data store.

6. The computer-implemented method of claim 5, further comprising:
selecting, from the operator tree, a first node corresponding to the first operation; and
switching a relative position of the first node and a child node of the first node corresponding to the second operation, the relative position of the first node and the child node being switched based at least on the first operation and the second operation being non-conflicting operations.

7. The computer-implemented method of claim 6, further comprising:
traversing the operator tree to select a second node corresponding to third operation; and
switching a relative position of the second node and a child node of the second node, when the third operation and a fourth operation corresponding to the child node of the second node are determined to be non-conflicting operations.

8. The computer-implemented method of claim 7, wherein the operator tree is traversed starting from a leaf node of the operator tree, and wherein the traversing of the operator tree includes skipping over one or more nodes corresponding to split cause operations.

9. The computer-implemented method of claim 1, further comprising:
obtaining, from the first data store, a first estimate and a second estimate of a size of an output data, the first estimate corresponding to an amount of the encrypted data transferred from the first data store when the first operation is performed at the first data store, and the second estimate corresponding to an amount of the encrypted data transferred from the first data store when the first operation is not performed at the first data store; and
determining to push down the first operation based at least on the first estimate not exceeding the second estimate.

10. The computer-implemented method of claim 9, wherein the first estimate and the second estimate are obtained from the first data store in response to an output size of the first operation being greater than an input size of the first operation.

11. The computer-implemented method of claim 1, wherein performing the first operation at the first data store instead of the second data store decreases an amount of data that is at least one of transferred from the first data store to the second data store and decrypted at the second data store.

12. A system, comprising:
at least one processor; and
at least one memory including program code which when executed by the at least one memory provides operations comprising:
determining, for a query comprising a plurality of operations, a first workload distribution between a first data store storing encrypted data and a second data store storing unencrypted data, the query including a first portion that can be performed on the encrypted data and a second portion that cannot be performed on the encrypted data, the first workload distribution being determined based at least on the second portion of the query being unable to be performed on the encrypted data in the first data store, and the first workload distribution indicating that the first portion of the query is to be performed at the first data store and the second portion of the query is to be performed at the second data store;
determining, based at least on the first workload distribution, a second workload distribution, the determining of the second workload distribution comprising a reordering of at least a first operation and a second operation in the second portion of the query, the first operation and the second operation being reordered based at least on the first operation and the second operation being non-conflicting operations that can be at least one of commuted, distributed, and combined without affecting a respective result of the first operation and the second operation, and the reordering including pushing down, to the first portion of the query, the first operation such that the first operation is performed at the first data store instead of at the second data store; and
executing the query, the executing comprising distributing, to the first data store and the second data store, respective portions of an execution plan corresponding to the first portion of the query and the second portion of the query, the execution plan being generated based at least on the second workload distribution.

13. The system of claim 12, wherein the encrypted data in the first data store is generated at least by applying one or more encryption schemes.

14. The system of claim 13, further comprising:
identifying a split cause operation present in the query, the split cause operation being an operation that is incompatible with the one or more encryption schemes applied at the first data store and unable to be performed on the encrypted data in the first data store; and
including, in the second portion of the query, the split cause operation.

15. The system of claim 12, wherein the determining of the second workload distribution further comprises:
identifying, based at least on an operator tree corresponding to the query, the first operation to push down to the first portion of the query, the first operation being identified based at least on the first operation being an operation that can be performed on the encrypted data in the first data store.

16. The system of claim 15, further comprising:
selecting, from the operator tree, a first node corresponding to the first operation; and switching a relative position of the first node and a child node of the first node corresponding to the second operation, the relative position of the first node and the child node being switched based at least on the first operation and the second operation being non-conflicting operations.

17. The system of claim 15, further comprising:
obtaining, from the first data store, a first estimate and a second estimate of a size of an output data, the first estimate corresponding to an amount of the encrypted data transferred from the first data store when the first operation is performed at the first data store, and the second estimate corresponding to an amount of the encrypted data transferred from the first data store when the first operation is not performed at the first data store; and
determining to push down the first operation based at least on the first estimate not exceeding the second estimate.

18. A non-transitory computer-readable storage medium including program code which when executed by at least one processor causes operations comprising:
determining, for a query comprising a plurality of operations, a first workload distribution between a first data store storing encrypted data and a second data store storing unencrypted data, the query including a first portion that can be performed on the encrypted data and a second portion that cannot be performed on the encrypted data, the first workload distribution being determined based at least on the second portion of the query being unable to be performed on the encrypted data in the first data store, and the first workload distribution indicating that the first portion of the query is to be performed at the first data store and the second portion of the query is to be performed at the second data store;
determining, based at least on the first workload distribution, a second workload distribution, the determining of the second workload distribution comprising a reordering of at least a first operation and a second operation in the second portion of the query, the first operation and the second operation being reordered based at least on the first operation and the second operation being non-conflicting operations that can be at least one of commuted, distributed, and combined without affecting a respective result of the first operation and the second operation, and the reordering including pushing down, to the first portion of the query, the first operation such that the first operation is performed at the first data store instead of at the second data store; and
executing the query, the executing comprising distributing, to the first data store and the second data store, respective portions of an execution plan corresponding to the first portion of the query and the second portion of the query, the execution plan being generated based at least on the second workload distribution.

* * * * *